Figure 1:
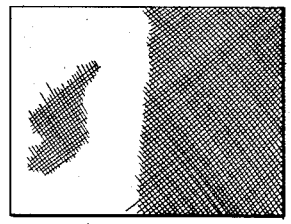

Aug. 29, 1944.         E. G. REED         2,356,948
              METHOD FOR COVERING ARTICLES
                   Filed June 14, 1940

Inventor
Eva G. Reed

By
Attorney

Patented Aug. 29, 1944

2,356,948

UNITED STATES PATENT OFFICE 2,356,948

METHOD FOR COVERING ARTICLES

Exa G. Reed, Akron, Ohio, assignor to Wingfoot Corporation, Wilmington, Del., a corporation of Delaware Application June 14, 1940, Serial No. 340,563

1 Claim. (Cl. 18—56)

This invention relates to articles formed by shrinking woven fabrics of rubber hydrochloride or other heat-shrinkable non-elastic material, including heat-shrinkable vinyl and cellulosic derivatives, etc. More particularly the invention relates to the covering of an object or form with a permanent or temporary covering of woven rubber hydrochloride material and then shrinking the rubber hydrochloride to fit the shape of the object or form. The invention includes both the process and the product. The articles made by temporarily covering a form with a woven heat-shrinkable fabric, then shrinking the fabric to fit the form and then removing the resulting shrunken fabric, include ladies' hats, baskets, lamp shades and the tops of women's shoes and the like. The permanent covers formed according to this invention include chair seats and table tops with covers shrunken to them. The invention will be described more particularly as it relates to rubber hydrochloride products.

For some time there has been on the market a rubber hydrochloride film which has been sold as "Pliofilm" rubber hydrochloride sheet. Such a sheet may be formed as described in Calvert United States Patent 1,989,632. It may be cast from a solution of rubber hydrochloride in a volatile organic solvent. Such a film may be heated and stretched and cut into strips and the strips rolled or twisted into strands which may be used in forming the woven rubber hydrochloride material used in carrying out the invention. The material of the invention may likewise be made from threads formed from stretched filaments produced by extrusion of a rubber hydrochloride solution into a precipitating bath.

A stretched rubber hydrochloride product will shrink when it is heated. The woven fabric, from which the articles of the present invention may be produced, is formed of stretched rubber hydrochloride which on heating to 120° C. will shrink at least fifty per cent. For example, the rolled or twisted stretched film, when heated, will shrink to film with an area no greater than one half the original area of the film before twisting or rolling. The extruded filaments will, on heating to this temperature, shrink to filaments of a length no greater than one half the length of the stretched filaments.

Both the warp and woof of the woven fabric used in carrying out the present invention are composed of rubber hydrochloride. The fabric may be made wholly or only partially from stretched rubber hydrochloride material. The rubber hydrochloride may be colored with dyes or pigments and may contain a plasticizer, stabilizer, etc.

According to this invention the woven fabric made of stretched rubber hydrochloride or the like is placed over a form such as a lamp shade form or over an object which is to be permanently covered, such as a chair seat or a table top. The fabric must be held in place so that on shrinking it does not slip.

Figure 2:
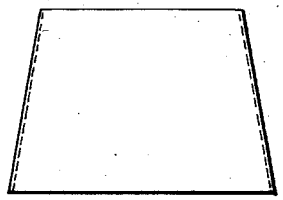
Figure 3:
Figure 4:
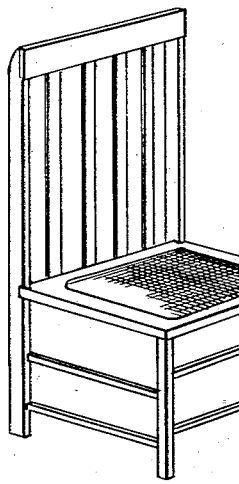

The invention will be further described in connection with the accompanying drawing in which Fig. 1 shows a cylindrical woven sheet; Fig. 2 shows a form over which it is placed in the manufacture of a lamp shade; Fig. 3 shows the finished lamp shade; and Fig. 4 shows in perspective a chair with the seat covered according to this invention.

For example, in covering a table top, it is desirable to tack the margins of the cover under the lower edge of the table cover to hold this edge in position during the shrinking of the woven fabric. In covering a lamp shade, a cylindrical section of the woven fabric such as shown in Fig. 1 is placed over a conical form such as shown in Fig. 2 and held in place, so that on shrinking the fabric assumes the shape of a conical section. In doing so the portion of the fabric which covers the base of the core shrinks to a less extent than that which covers portions of the core which are of less diameter than the base, and therefore in the finished article is stretched to a greater degree than the latter. The fabric is then heated to cause it to shrink and take the form of the object which it covers. Fig. 3 shows the finished lamp shade and the dotted lines at its upper and lower margins indicate means for holding the woven fabric in place during the shrinking. The amount of the shrinking is relatively inappreciable. The area of the woven sheet will be decreased by only a small amount, for example, not over fifteen or twenty per cent of its original stretched area. However, the amount the fabric shrinks is sufficient to cause it to take the form of the object which it is covering. After shrinking the fabric is cooled to cause it to set. If the covering is but temporary, it is cooled before it is removed from the form.

Although in general both the warp and woof are made of stretched rubber hydrochloride material, it is evident that in the formation of a lamp shade, for example, it is only the strands of rubber hydrochloride running around the conical form which must be shrunken. It is not necessary to shrink any of the strands running perpendicular on the form. In such a case only those strands which run around the form need be made from the stretched material.

By temporarily covering a suitable form and shrinking a woven fabric of stretched rubber hydrochloride material to it, a great variety of articles may be formed. For example, women's bags may be shaped in this manner. Hats and the like may be similarly shaped. The uppers of sandals and slippers and ladies' shoes may be similarly formed from a piece of such woven fabric. The woven fabric of the stretched rubber hydrochloride is simply placed over the form and then heated to cause it to shrink, and then while still in place on the form, it is cooled to cause it to set. In the formation of ladies' shoe uppers and the like, it may be desirable to place the woven fabric over the instep on the bias in order to cause it to shrink to the proper shape.

An example of the formation of a permanent cover will be described more particularly in connection with the covering of a chair seat such as shown in Fig. 4. Rubber hydrochloride film about .001 inch thick which has been heated and then stretched to three hundred per cent of its original area is cut into strips about three-eighths of an inch wide. These are rolled on the bias to form a strand or thread-like structure. Many such strands are woven to form a piece of fabric sufficiently large to cover the seat. By using differently colored fabrics, attractive patterns are produced. The woven fabric is placed over the seat to be covered, and the edges are turned over the edge of the seat and fastend to its under side by suitable means, such as, staples or the like. If the seat is of the usual upholstered type, the flat piece will be wrinkled or overlapped near the edges of the top and over the edges and bottom of the support. The covered seat is now heated to a temperature in the neighborhood of 90 to 100° C. This may be done by placing the covered seat in the oven. The stretched rubber hydrochloride retracts on such heating. In this way the wrinkles are removed from the upper surface, and at least to some extent over the edges and bottom of the support. The portion of the film which covers the edges and bottom portion of the seat necessarily shrinks more than that which covers the top of the seat so that in the finished product the central portion of the fabric which covers the top of the seat is stretched more than the border of the fabric which covers the edges and bottom of the seat. A perfectly smooth cover of the desired shape results.

The temperature of heating may vary. In general a temperature around 100° C. will be used with rubber hydrochloride, but this may be varied depending upon the extent to which the rubber hydrochloride material has been stretched and the amount of shrinkage desired etc. Heated to around 130° C., the tendency is for the stretched rubber hydrochloride to retract to its original unstretched condition. If heated to this temperature for a sufficiently long time, the cover would be apt to shrink to such an extent as to cause it to tear away from the staples. The proper degree of heating for any desired shrinkage can be readily determined. Instead of placing the material to be shrunken in an oven, the whole of it or portions of it may be heated with a jet of steam or hot air to produce the desired shrinkage. The heating may be limited to the areas which are to be shrunken.

The woven sheet may be made from rubber hydrochloride in any desired manner. A preferred form of woven fabric is formed of strands made by roling or twisting or crumpling strips of stretched film about one-eighth of an inch to one inch in width. Such thin crumpled material reflects the light in a pleasing way. The film may be either tightly or loosely rolled or twisted. For example, the warp may be of a tightly twisted material, or threads composed of stretched extruded filaments of rubber hydrochloride, and the woof may be of loosely crumpled material. Many attractive effects may be obtained by using different colors and rubber hydrochloride strands constructed in different ways.

I claim:

The method of covering a relatively flat top of an article of furniture which comprises placing a woven fabric of stretched rubber hydrochloride thereover, fastening the edges of the fabric, and then applying heat to the fabric to cause it to shrink and fit the top more exactly and thus remove wrinkles from the portion of the fabric at the edge of the top thereof and thereby lose no more than a part of said stretch.

EXA G. REED.